United States Patent
Wilson (10) Patent No.: US 6,936,984 B2
(45) Date of Patent: Aug. 30, 2005

(54) METHOD AND SYSTEM FOR DETECTING THE POSITION OF A POWER WINDOW OF A VEHICLE

(75) Inventor: Robert H. Wilson, Farmington Hills, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 09/939,138

(22) Filed: Aug. 24, 2001

(65) Prior Publication Data

US 2002/0047678 A1 Apr. 25, 2002

Related U.S. Application Data

(60) Provisional application No. 60/228,530, filed on Aug. 28, 2000.

(51) Int. Cl.$^7$ .............................. H02P 1/00; H02P 3/00; H02P 5/00; H02P 7/00
(52) U.S. Cl. ........................ 318/280; 318/264; 318/283; 318/445
(58) Field of Search ................................ 318/480, 264, 318/283, 445, 446, 280

(56) References Cited

U.S. PATENT DOCUMENTS

| | | |
|---|---|---|
| 4,274,226 A | 6/1981 | Evans |
| 4,471,274 A | 9/1984 | Ross et al. |
| 4,683,975 A | 8/1987 | Booth et al. |
| 4,701,684 A | 10/1987 | Seidel et al. |
| 4,794,248 A | 12/1988 | Gray |
| 4,829,174 A | 5/1989 | Booth et al. |
| 4,894,952 A | 1/1990 | Trett et al. |
| 4,910,464 A | 3/1990 | Trett et al. |
| 4,943,757 A | 7/1990 | Richter et al. |
| RE33,668 E | 8/1991 | Gray |
| 5,039,925 A | 8/1991 | Schap |
| 5,054,686 A | 10/1991 | Chuang |
| 5,069,000 A | 12/1991 | Zuckerman |
| 5,074,073 A | 12/1991 | Zwebner |
| 5,075,632 A | 12/1991 | Payne et al. |
| 5,079,417 A | 1/1992 | Strand |
| 5,131,506 A | 7/1992 | Mizuno et al. |
| 5,233,185 A | 8/1993 | Whitaker |
| 5,245,177 A | 9/1993 | Schiller |
| 5,263,762 A | 11/1993 | Long et al. |
| 5,278,480 A | 1/1994 | Murray |
| 5,326,967 A | 7/1994 | Herrmann et al. |
| 5,334,876 A | 8/1994 | Washeleski et al. |
| 5,389,920 A | 2/1995 | DeLand et al. |

(Continued)

FOREIGN PATENT DOCUMENTS

| | | |
|---|---|---|
| DE | 28 21 681 | 11/1979 |
| DE | 88 16 727 .5 U1 | 7/1990 |
| DE | 89 15 971.3 U1 | 9/1992 |
| DE | 42 01 019 C2 | 7/1993 |
| FR | 2 685 503 | 6/1993 |
| GB | 2 288 014 | 10/1995 |
| GB | 2 334 751 | 9/1999 |
| WO | WO 94/08120 | 4/1994 |

*Primary Examiner*—Marlon Fletcher
(74) *Attorney, Agent, or Firm*—Brooks Kushman P.C.

(57) ABSTRACT

A window position detection and anti-pinch system and method for detecting the presence of an obstruction between a window and window frame of a door assembly of a vehicle is disclosed. The system includes at least one sensing device disposed adjacent the window detecting the position of the window in the window frame and generating an output representative of the detected position of the window. A controller responsive to the output generated by the at least one sensing device compares the window position signal output against predetermined values to determine window position and whether an obstruction exists between the window and window frame.

19 Claims, 4 Drawing Sheets

U.S. PATENT DOCUMENTS

| | | | |
|---|---|---|---|
| 5,396,158 A | 3/1995 | Long et al. | |
| 5,410,149 A | 4/1995 | Winston, Jr. et al. | |
| 5,410,227 A | 4/1995 | Toyozumi et al. | |
| 5,418,359 A | 5/1995 | Juds et al. | |
| 5,426,293 A | 6/1995 | Miller et al. | |
| 5,428,923 A | 7/1995 | Waggamon | |
| 5,436,539 A | 7/1995 | Wrenbeck et al. | |
| 5,509,504 A * | 4/1996 | McHugh et al. | 187/316 |
| 5,592,777 A | 1/1997 | Petri et al. | |
| 5,621,290 A | 4/1997 | Heller et al. | |
| 5,689,160 A | 11/1997 | Shigematsu et al. | |
| 5,701,063 A | 12/1997 | Cook et al. | |
| 5,801,501 A | 9/1998 | Redelberger | |
| 5,886,307 A | 3/1999 | Full et al. | |
| 5,932,931 A | 8/1999 | Tanaka et al. | |
| 5,952,801 A | 9/1999 | Boisvert et al. | |
| 5,955,854 A | 9/1999 | Zhang et al. | |
| 5,994,858 A | 11/1999 | Miura | |
| 5,998,951 A | 12/1999 | Dove | |
| 6,020,703 A | 2/2000 | Telmet | |
| 6,032,415 A | 3/2000 | Tajima | |
| 6,034,495 A | 3/2000 | Tamagawa et al. | |
| 6,034,497 A | 3/2000 | Tamagawa et al. | |
| 6,051,829 A | 4/2000 | Full | |
| 6,051,945 A * | 4/2000 | Furukawa | 318/280 |
| 6,064,165 A | 5/2000 | Boisvert et al. | |
| 6,080,981 A | 6/2000 | Payne | |
| 6,208,101 B1 * | 3/2001 | Seeberger et al. | 318/466 |

* cited by examiner

METHOD AND SYSTEM FOR DETECTING THE POSITION OF A POWER WINDOW OF A VEHICLE

CROSS-REFERENCE TO RELATED APPLICATIONS

This application claims the benefit of U.S. provisional application Ser. No. 60/228,530 filed Aug. 28, 2000.

BACKGROUND OF THE INVENTION

1. Field of the Invention

The present invention relates to a position detection and anti-pinch system for a power window of a vehicle and more particularly to a position detection and anti-pinch system and method for detecting the position of a window in a vehicle door assembly.

2. Background Art

Door assemblies for automotive vehicles generally include a metal door frame attached to the body of a vehicle. The door frame generally includes inner and outer door frame panels joined about a common edge and a door sill running along top edge of the door to define a window frame. The window frame includes an opening or channel extending through the door frame to receive a window pane. A reinforcement panel may be attached to the inner door panel to provide additional structural support for the door frame and to receive various hardware components. Hardware components such as a handle assembly, window regulator and motor assembly, and electrical components such as interior lights and speakers, are secured to the reinforcement panel concurrently with assembly of the vehicle door.

Certain vehicle door assemblies include automatic vehicle window adjustment having a "one-touch up" feature. The "one-touch up" feature allows a passenger to raise the window pane with a single touch of a control button on the vehicle door. When actuated, the switch activates a motor assembly operatively connected to a window regulator, causing the window regulator to move the window pane upward toward the top of the window frame to a fully closed position without additional operator intervention. Of particular concern with such "one-touch" systems is that the passenger may not be able to stop the upward travel of the window pane if an object or an appendage of a person becomes pinched or trapped between the moving window and the window frame, which may lead to significant bodily harm.

Several types of obstruction detection systems have been proposed for vehicle door assemblies. One known obstruction detection system includes a control module which senses current spikes in the window drive motor or pressure on the window which would indicate an obstruction being pinched between the upward moving window and the window frame. The obstruction detection system stops and/or reverses the motor upon sensing the current spike or increased pressure while raising the motor. The problem with this design is that an object must be trapped or pinched with sufficient force for the system to sense the need to reverse the motor and lower the window, causing undesirable injury to an occupant prior to the lowering of the window. Further, the sensor is mounted adjacent the motor rather than the window pane, which does not provide an accurate measurement if an object becomes trapped between the window and window pane.

Another known obstruction detection or anti-pinch system includes a window seal with a gasket having varying resistivity based upon its level of compression. For example, if an obstruction is pinched between the window and the window frame, the gasket is locally compressed, which alters the resistivity of the gasket. A low current is applied through the gasket, and the variation in resistivity may be sensed to determine the existence of the obstruction, at which point upward movement of the window would be stopped. The system is not particularly desirable because the resistive gasket and associated electronics may be costly and injury may still occur prior to the lowering of the window.

Generally, it is known in window control designs to determine the velocity of a power window via pulses from the rotation of a motor's shaft. These pulses are generated by Hall sensors (magnetic sensing), CPD (commutator pulse detection) or switches that provide an open or closed circuit as the motor spins. To coordinate a system to detect information about a moving power windowpane, a supplier must change the system that they are designing to accept these pulses. Control algorithms must then be used to determine the velocity and position of the windowpane based on the received the pulse information. This task is especially critical when considering safety standards like FMVSS 118, where an obstacle must be detected during an auto-up function before a predetermined force is exerted on the window as a result of an obstruction in the path of the power window.

With such stringent guidelines, the control system in such motor pulse generating arrangements must "learn" the characteristics of not only the motor, but the regulator, grease and all of the mechanical linkages between the motor and the window. The system must also be able to accommodate temperature variation and different road conditions into the control process. All of these factors must be considered to provide flawless auto-up operations.

Accordingly, it is desirable to provide an improved window position detection and anti-pinch system for an automatic power window of a vehicle. It is also desirable to provide a window position detection system incorporating an anti-pinch detection system which prevents an obstruction from becoming trapped or lodged between a window and a window frame of the vehicle door.

SUMMARY OF THE INVENTION

The present invention overcomes the above-referenced shortcomings of prior art obstruction detection systems by providing a window position detection and anti-pinch system and method for detecting the presence of an obstruction between a window and window frame of a door assembly of a vehicle. The system includes at least one sensing device disposed adjacent the window for detecting the position of the window relative to the window frame. The at least one sensing device monitors the position of the window and generates an output representative of the detected position of the window relative to the window frame A controller is in communication with and is responsive to the output generated by the at least one sensing device. The controller compares the window position output signals generated by the at least one sensing device against predetermined values to determine whether an obstruction exists between the window and window frame. The controller will generate a control signal to stop and reverse the travel of the window upon detection of an obstruction between the window and window frame.

DETAILED DESCRIPTION OF THE PREFERRED EMBODIMENT(S)

Figure 1:
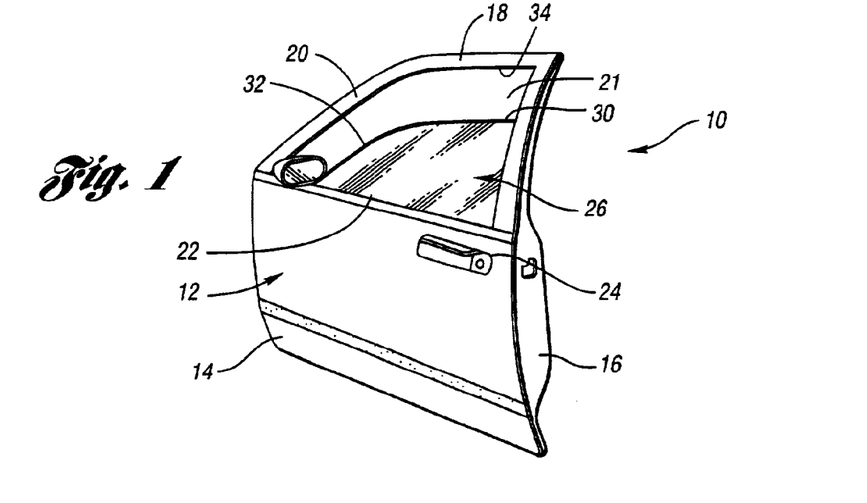
FIG. 1 is a perspective view of a vehicle door assembly including a window position detection system of the present invention.

Referring now to the Figures, a description of the window position detection system of the present invention is discussed in greater detail. A vehicle door assembly 10 includes a vehicle door frame 12 having an outer door panel 14 and an inner door panel 16. Inner and outer door panels 14, 16 are generally vertical panels formed of a stamped sheet metal which are joined to form vehicle door frame 12. Alternatively, vehicle door frame 12 may be formed as a one piece structure. The vehicle door frame 12 includes a header section 18 having a door sill 20 defining a opening 21 in a window frame 28. An passage or channel 22 is provided in a bottom surface of window frame 28 and communicates with the inner periphery between inner and outer door panels 14, 16 in vehicle door frame 12. A handle 24 is mounted in the outer door panel 14.

Door assembly 10 may include a structural member or carrier (not shown) mounted to the inner door panel 14 to provide structural support for the vehicle door frame 12 and to receive a plurality of components. Alternatively, the interior vehicle components may be directly secured to the door frame 12. A window carrier assembly is mounted to the carrier on door frame 12 to receive and support a window pane 26. Window carrier assembly generally includes a window regulator and a motor operatively connected to the window regulator to vertically adjust window pane 26.

In a preferred embodiment of the invention, window pane 26 is secured to a generally horizontal support arm of the window regulator extending between a pair of generally vertical spaced apart rails. The support arm is set in a track extending through each of the vertical rails of the window regulator. A pair of cables operatively connected to the motor raise and lower the support arm to adjust the vertical position of window pane 26.

The window pane 26 moves vertically through the window frame 28 in the spaced apart vertical rails towards the header section 18 and door sill 20 of door frame 12. A seal extends through the inner periphery of a cavity in window frame 28 to receive the upper edges 30, 32 of window pane 26. The seal, which is preferably formed of rubber or other polymeric material, ensures a waterproof and soundproof seal for the interior passenger compartment of the vehicle by sealing the upper edges 30, 32 of window pane 26 and the inner periphery 34 of window frame 28 respectively.

Figure 2:
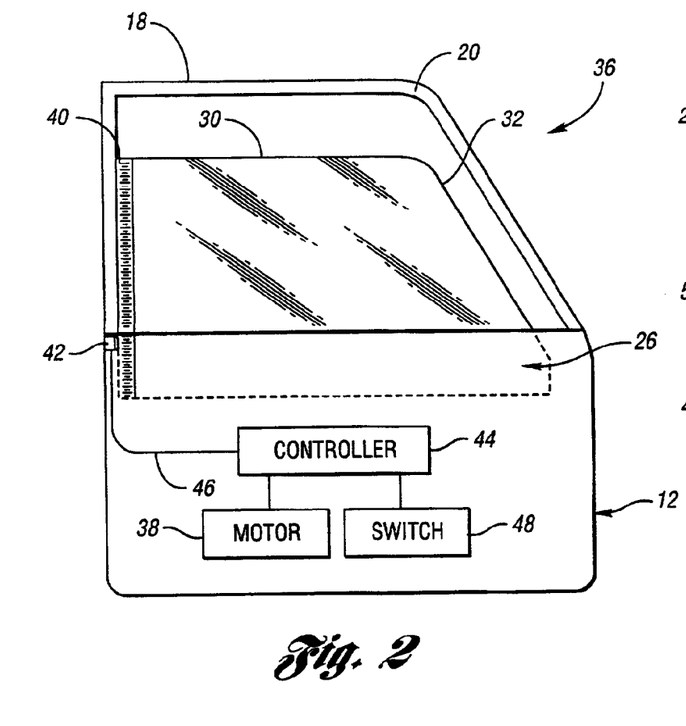
FIG. 2 is a schematic view of a vehicle door assembly incorporating a first embodiment of the window position detection system of the present invention.
Figure 3:
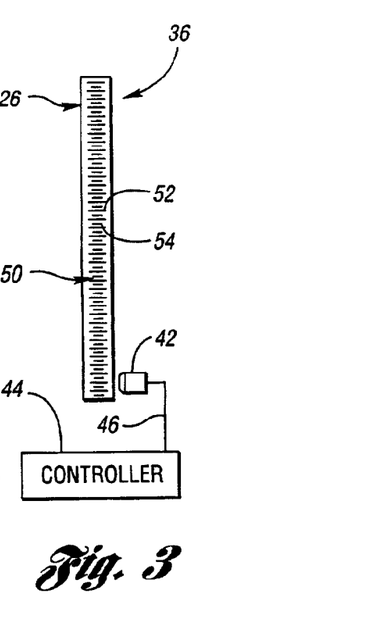
FIG. 3 is a schematic view of the first embodiment of the window position detection system in accordance with the present invention.

Referring now to FIGS. 2 and 3, a first embodiment of the window position detection and anti-pinch system of the present invention is discussed in greater detail. Window position detection system 36 includes a window 26 operatively connected to a reversible motor 38, an optical or magnetic coding arrangement 40 disposed on a side or edge of the window 26, and an optical or magnetic sensing device 42. As is best seen in FIG. 3, sensing device 42 is coupled to a microprocessor or controller, represented schematically by block 44, through wires 46. Alternatively, sensing device 42 may be in wireless communication with controller 44 via an RF transmitter and receiver or other wireless communication devices. A switch, represented schematically by block 48, is actuated by a passenger of a vehicle to raise or lower the window pane 26 in door assembly 10. The actuation of switch 48 causes controller 44 to send a signal to motor 38 to raise or lower window 26.

In accordance with the first embodiment of the invention, coding arrangement 40 can be etched into the window during manufacture, or put on a media 50, shown in FIG. 3, that is applied/adhered to the window pane 26 during assembly of the vehicle. The coding forms a series of binary digits, i.e., ones and zeros, represented schematically by 52 and 54 respectively, that are evenly spaced and correlated with window position so as to convey the vertical position of the window to the microprocessor/controller 44. Such correlation can be carried out via an initial "learning" process that allows individual identification of a particular vehicle's closed window, i.e., "all the way up," and open window, i.e., "all the way down," positions. This process can be performed, for example, as part of the vehicle assembly process.

After the initial learning phase is completed, the controller 44 of system 36 will utilize the learned boundaries as a reference base for position sensing of the window 26. The boundaries would only need to be reset if the physical parts of the system somehow become misaligned. Such a process advantageously provides a manufacturing plant a simple process of applying the coding to the window that is independent of the car manufacturer. In other words, the system can be put on any platform without concern of window or motor suppliers as long as the initial learning process occurs.

Sensing device 42 of window position detection system 36 is provided adjacent coding arrangement 40 on window 26. In an exemplary embodiment, sensing device 42 generally includes a sensor, such as a magnetic field type sensor or an optical (infrared) sensor, and a transmitter for generating output signals based on input detected by the sensor. Sensing device 42 is preferably mounted in the inner periphery of the vehicle door frame 12 between inner and outer door panels 14, 16 adjacent the passage 22 in the bottom edge of window frame 28 and an outer edge of window 26.

In operation, as the window pane 26 moves upward in door assembly 10, sensor of sensing device 42 measures and receives high and low input signals corresponding to the digital coding 40 on window pane 26. Coding 40 is binary and is disposed a known distance apart. The transmitter of sensing device 42 generates signal interrupts or outputs based on sensor measurements representative of the window position relative to the window frame and transmits the measured signals to controller 44. Controller 44 is responsive to the output signals generated by the sensing device 42, to determine the vertical position of the window pane 26 relative to the window frame 28. Alternatively, controller 44 may compare output signals generated by sensing device 42 against predetermined values to determine whether an obstruction exists between the window and window frame. It is also understood that other sensor output arrangements may be employed with sensing device 42 and controller 44 of system 36.

Window position detection system 36 additionally operates as an anti-pinch system for vehicle door assembly 10. This feature is especially helpful when incorporated into a system having a one-touch-up type operation, i.e., a system that allows a window to be closed or opened by a single actuation of a button or switch. Window position detection system 36 includes a "self checking" option incorporated in controller 44. Coding 40 provides static position detection measurements to controller 44. Controller 44 monitors the output signals generated by sensing device 42 to detect vertical position of the window 26 relative to window frame 28. The controller 44 additionally compares the window position against predetermined values to detect the presence of an obstruction between the window 26 and window frame 28. Since controller 44 knows what value to expect next during the upward or downward travel of window pane 26, the controller 44 can detect a system error when the expected value is not received, or not received within a particular time period corresponding to the expected velocity of the window 26. If such a condition is detected, controller 44 can generate an alert signal to warn the occupant of the vehicle to check the window 26 in door assembly 10.

The self-checking feature of controller 44 can be used to stop automatic operation of the window 26 if an error is detected. In operation, coding arrangement 40 of system 36, in addition to sensing static window position, allows controller 44 to detect the presence of obstructions between to upper edges 30, 32 of window pane 26 and window frame 28. The microprocessor/controller 44 detects any change in the velocity of travel of the window pane 26 in the door assembly 10 to determine the presence of an obstruction. Since the system can determine the position and velocity of the window 26, system 36 can "sense" the presence of an obstacle in the window path by detecting a decrease in velocity at a certain window position. If such a condition is detected, the controller 44 can initiate a control sequence, transmitting a signal to motor 38 to stop and/or reverse the travel of the window 26 in window frame 28.

Figure 4:
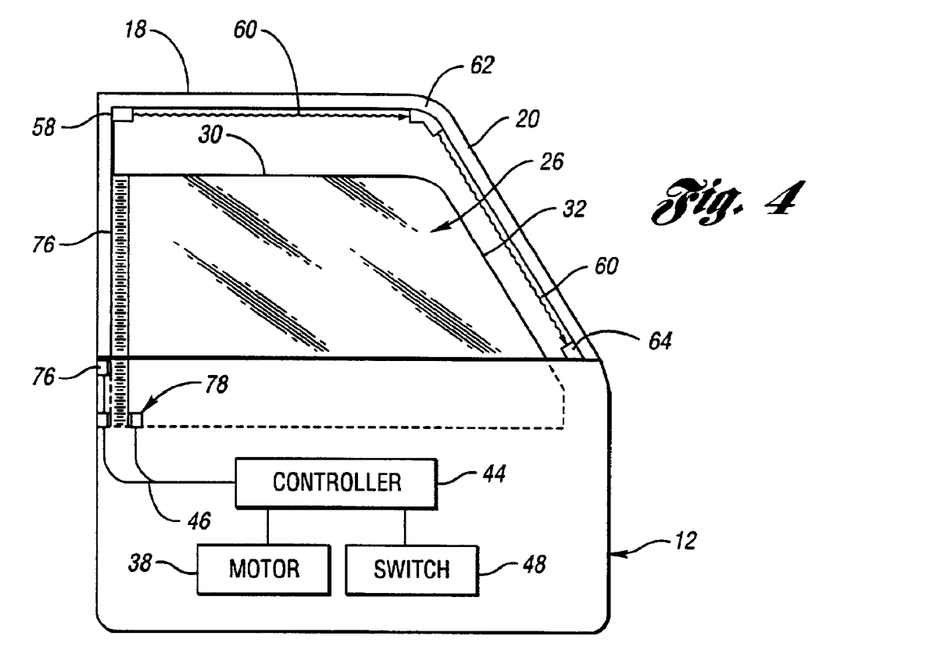
FIG. 4 is a schematic view of a vehicle door assembly incorporating a second embodiment of the window position detection system of the present invention.
Figures 5, 6:
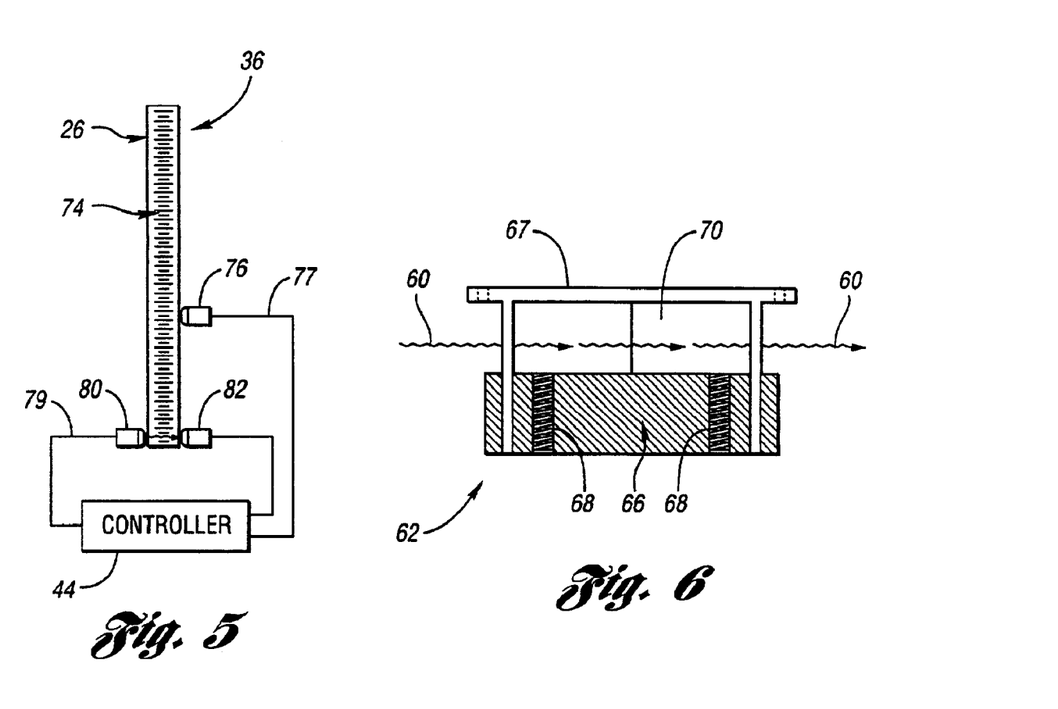
FIG. 5 is a schematic view of the second embodiment of the window position detection system in accordance with the present invention.
FIG. 6 is a plan view of a prism incorporated in the second embodiment of the window position detection system of the present invention.

Referring now to FIGS. 4–6, a second embodiment of the window position detection and anti-pinch system of vehicle door assembly 10 of the present invention is disclosed. The second embodiment of window position detection system, generally referenced by numeral 56, provides an anti-pinch arrangement for detecting obstacles during the upward travel of a window pane 26 during a one-touch-up operation. System 56 includes two redundant detection methods to determine whether or not an obstacle is in the way of a moving power window 26.

A transmitter 58 is recessed into a top rear portion of the door frame 12 below header section 18 to a monitor the opening 22 of window frame 28. Transmitter 58 sends a energy signal 60, such as directed infrared light, or an ultrasound wave, along inner periphery 34 of the window frame adjacent the upper portion of window frame 28. Transmitter 58 is designed to emit ac signal that is laser thin so as to be unnoticeable to the operator and that is coded and sufficiently filtered to attenuate sunlight or other ambient light.

The signal 60 generated by transmitter 58 follows the linear outline of the window frame 28 bent via a prism 62 at a change in angle of the door frame 12. Prism 62 is positioned in the path of signal 60 and is arranged to redirect signal 60 along the edge of window frame 28 adjacent door sill 20 toward a receiver 64. Receiver 64 is adapted to detect any variation in the transmission of electromagnetic energy signal 60 from the transmitter 58. Alternatively, fiber optics could be used to send and receive infrared light, and communicate with the controller 44. As is shown in FIG. 6, prism 62 may additionally include a shutter 66 arranged to block the energy signal 60 entering prism 62 if an obstruction contacts a lower end of shutter 66. If an obstacle intrudes into the area of interest near the bottom of the prism 62, springs 68 will compress, forcing the prism 62 upward in the housing 67 over the prism lens 70, thereby breaking the energy signal 60 between the transmitter 58 and receiver 64.

The transmitter 58, prism 62 and receiver 64 monitor a distinct area of the passage 22 in window frame 28 between the upper edges 30, 32 of window 26 and the inner surfaces of window frame 28. Controller 44 is in communication with the transmitter 58 and receiver 64 by wires 72 to generate and process the signals detected. Controller 44 terminates the upward travel of the window pane 26 by generating a signal to stop and/or reverse motor 38 if an obstruction is detected between the window pane 26 and window frame 28 which breaks the continuity of the transmission. It is understood that transmitter 58, prism 62 and receiver 64 can be used with a variety of geometries of window frames 28 provided in vehicle door assemblies.

The second, redundant detection method is provided via a coding 74 on the window 26. In a preferred embodiment, coding 74 is provided on the window adjacent a portion extending within the window frame 28 of door assembly 10 such that the coding is unnoticeable to the passengers of the vehicle. Coding 74 allows the controller 44 through sensing devices 76, 78, to monitor the velocity and position of the window 26 during the upward travel of the window relative to window frame 28 of door assembly 10.

As best seen in FIG. 5, the coding 74 is measured via an infrared reflection arrangement 76, an infrared transmission arrangement 78, such as a suitable transmitter 80 and receiver 82 arranged to pass an infrared signal through the coding 74, or a capacitive or magnetic reading arrangement. The coding 74 is preferably equally spaced and arranged to be a known distance apart in a binary format. Monitoring arrangements 76, 78 detected coding 74 and generate output signals representative of the detected position of the window 26. Controller 44 monitors outputs from arrangements 76, 78 through wires 77, 79 to track the position of the window 26 based on the coding 74. With a known window mass, the controller 44 can be programmed to determine the force applied against the window by an obstruction based on predetermined values. If the window is not in a parked (all the way up or down) state and the force exceeds a predetermined limit, the controller 44 change the direction of travel of the window 26 by instructing the motor 38 to stop and/or reverse the movement of the window.

Referring now to FIGS. 7–10, alternative embodiments of the window position detection system for a vehicle door assembly of the present invention are disclosed. A window position detection and anti-pinch system 84 is provided on a vehicle door assembly 10 adjacent window pane 26. As is shown schematically in FIG. 7, system 84 uses a sensing arrangement 88, such as a rotary encoder, that monitors the position and velocity of the window as the window 26 travels through door assembly 10. Unlike prior art measuring systems which were mounted on or adjacent the motor 38 to measure changes in velocity at the motor, sensing arrangement 88 divorces itself from the motor altogether with the intention of providing clean pulses to a central processing unit or controller 90. Mounting sensing arrangement 88 adjacent window 26 provides a greater correlation between the measured values at the window to window velocity, force and position relative to the window frame 28.

Figure 7:
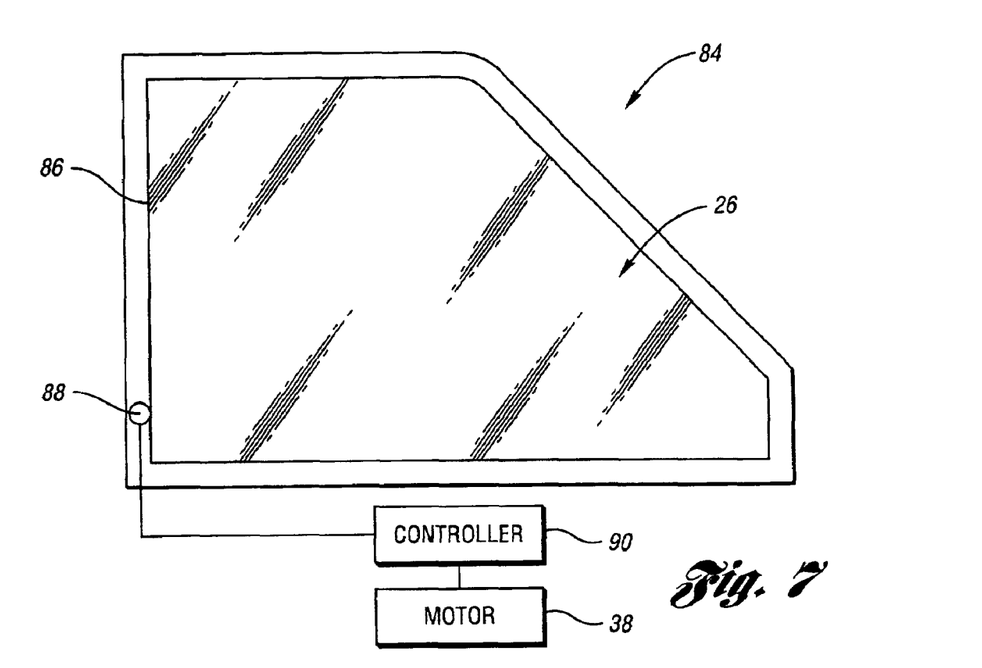
FIG. 7 is a schematic view of a vehicle door assembly incorporating another embodiment of the window position detection system of the present invention.

The window position detection system 84 includes an encoder 92 positioned adjacent to window and attached to a rotary member 94, such as a pulley or roller, via a shaft 96. The rotary member 94 is pressed against the window 26. In operation, the upward and downward travel of the window 26 in door assembly 10 rotates member 94. The rotational movement of member 94 is translated to the encoder 92 via shaft 96. The encoder can be arranged to provide a predetermined number of pulses per distance of movement of the window. The high resolution of this sensor, which can be tailored to the needs of the control system 84, provides a robust source of data for the controller 90. Further, because the data is directly based on actual window movement, rather than the velocity or the power output of the motor, the data provides a better correlation for determining the relative position of the window in operation or the presence of an obstruction between the window 26 and window frame 28.

Figure 8A:
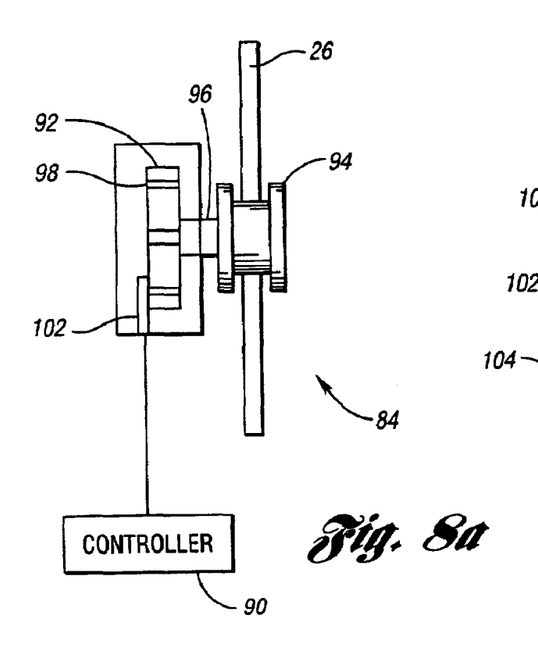
FIGS. 8(a)–(b) are diagrams of a window position detection system in accordance with a third embodiment of the present invention having a resistive or voltage rotary encoding arrangement.
Figure 8B:
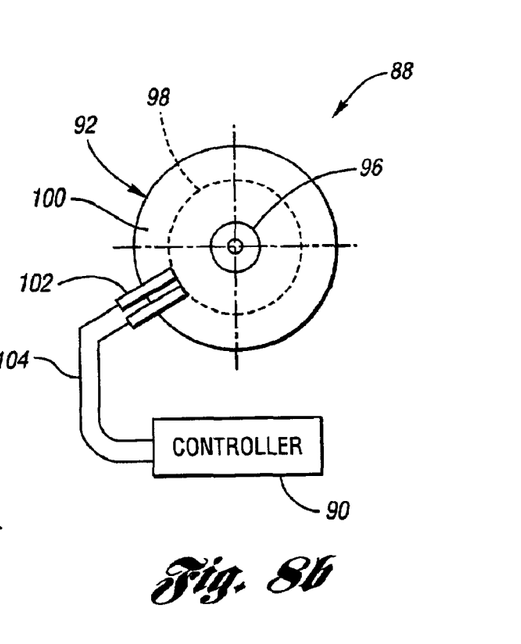

As is shown in FIGS. 8(*a*)–(*b*), a third embodiment of the of present invention is shown providing a window position and velocity detection system 84 having a resistive or voltage sensing rotary encoding arrangement 88 in lieu of a pulse generating circuit from the motor. In this embodiment, the window 26 itself is used as the basis for determining the window's position and velocity. With this arrangement, system reliability is improved while also providing independence of the window control system design from the design of the motor and window manufacture.

In accordance with this embodiment, a plurality of electrical contacts 98 are provided about the outer periphery 100 of rotary encoder 92. At least one corresponding electrical contact 102 is provided adjacent to and in engagement with electrical contacts 98 on rotary encoder 92. The at least one electrical contact 102 monitors pulses generated by the rotation of the electrical contacts 98 on rotary encoder 92 by the travel of the window 26 relative to window frame 28. Controller 90, responsive to the outputs from encoder 92 and in communication with the at least one electrical contact 102 through wires 104, electrically senses open and closed circuit connections between contacts 98 and 100 to determine the relative position, velocity and force of the window as well as the presence of any obstruction between the window 26 and window frame 28.

Figure 9A:
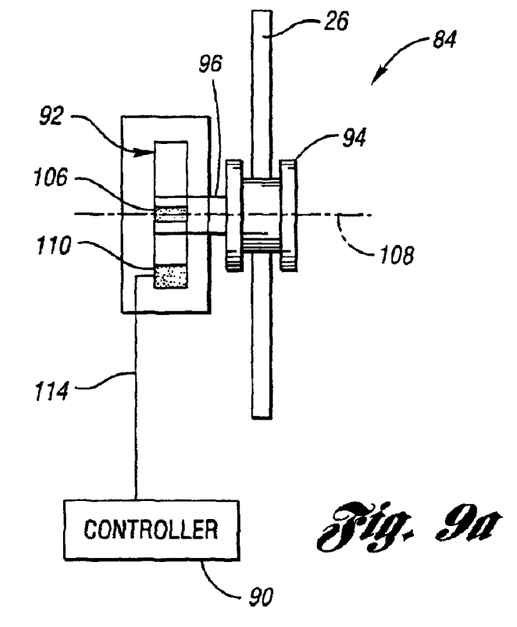
FIGS. 9(a)–(b) are diagrams of a window position detection system in accordance with a fourth embodiment of the present invention having a magnetic rotary encoding arrangement.
Figure 9B:
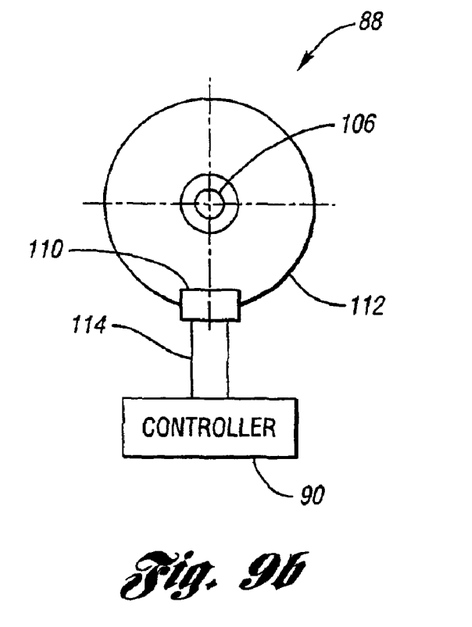

FIGS. 9(*a*)–(*b*) show another embodiment of the window position detection system 84 of the present invention. In this embodiment, a multi-poled magnet 106 is centrally disposed on the rotary encoder 92 and aligned with the rotational axis 108 extending through shaft 96. A Hall effect sensor 108 is disposed radially outwardly of magnet 106 on an outer edge 112 of the rotary encoder 92. Sensor 108 communicates with controller 90 through wires 114 to provide pulse measurements of position and velocity by magnetically sensing the revolution of the multi-poled magnet 106 via the Hall effect sensor 108.

Figure 10A:
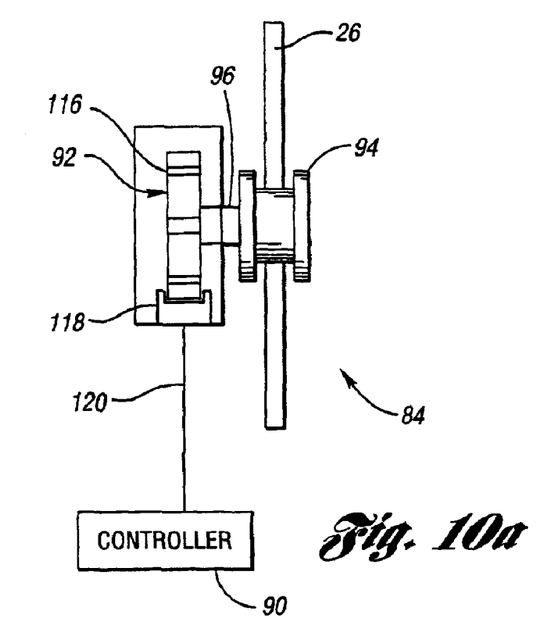
FIGS. 10(a)–(b) are diagrams of a window position detection system in accordance with a fifth embodiment of the present invention having an optical rotary encoding arrangement.
Figure 10B:
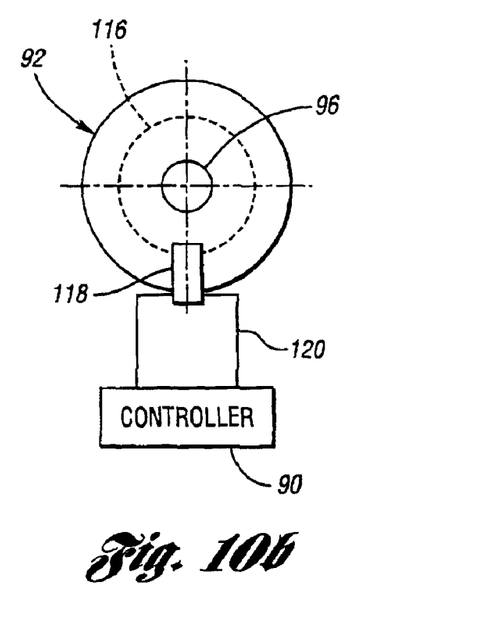

Referring now to FIGS. 10(*a*)–(*b*), a fifth embodiment of the window position detection and anti-pinch system 84 of the present invention is disclosed. In this embodiment, rotary encoder 92 includes intermittent holes 116 positioned therein which allow a energy signal, such as an infrared light beam, to pass through. A photointerrupter 118 is positioned adjacent to and about the outer periphery of the rotary encoder 92. Photointerrupter 118 generates pulses in response to interruption of the infrared beam as the encoder rotates in response to the travel of the window 26 in door assembly 10. Photointerrupter 118 transmits these pulses to controller 90 through wires 120. Controller 90 monitors the output signals to determine the position of the window relative to the window frame and compares the output signals generated by the photointerrupter 118 to determine whether an obstruction exists between the window 26 and window frame 28.

A description of the method of detecting the position of a window in a window frame of a vehicle door assembly of the present invention is described in greater detail below. A window position detection and anti-pinch system 36 described above is provided to monitor the position of the window 26 relative to the window frame 28. As is shown in FIGS. 1–6, sensing devices 42, 76, 78 are positioned adjacent window 26 and detect the binary coding of coding arrangement 40, 74 on window pane 26 as the window is raised and lowered to determine the position of the window relative to the window frame. Sensing devices 42, 76, 78 generate output signals based on the vertical position of the window in the window frame detected by the sensors. As shown in FIGS. 7–10, encoder 92 monitors the position of window 26 based on the rotational movement of rotary member 94. This information is transmitted from the sensing devices to the controller 44 for analysis.

When the operator actuates switch 48, a signal is sent to controller 44 to activate reversible drive motor 38 to raise or lower window 26 in window frame 28. Simultaneously, controller 44 activates the window position detection and anti-pinch system to monitor the travel of the window as the drive motor 38 raises or lowers window 26. The controller 44 is responsive to the output signals generated by the sensing devices of system 36 to detect window position relative to the window frame 28. Controller 44 compares output signals against predetermined values to determine whether an obstruction exists between the window 26 and window frame 28. If the controller detects a discrepancy in the time intervals between interrupt signals corresponding to window distance traveled, controller 44 will generate a control signal to stop and reverse motor 38. Motor 38 will then lower the window 26 to allow an occupant to remove the object or obstruction from between the window and window frame. Additionally, system 36 may also generate a visual or audible warning for the occupants of a vehicle in response to a mismatched value found by controller 44.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A window position detection and anti-pinch system for a motor vehicle door assembly having a window adjustably positionable in a window frame by a reversible motor operatively connected to the window, the system comprising:
   a coding arrangement having a plurality of indicia uniformly spaced and correlated to convey the vertical position of the window in the window frame etched into a surface of the window;
   at least one sensing device disposed adjacent the window for detecting the position of the window relative to the window frame, the at least one sensing device detecting the coding arrangement provided on the window and generating an output signal representative of the detected position of the window; and
   a controller responsive to the output of the at least one sensing device for comparing the output signal against predetermined values to determine whether an obstruction exists between the window and window frame.

2. The window position detection and anti-pinch system of claim 1 wherein the at least one sensing device comprises a first sensing device having a sensor detecting the coding arrangement located on the window and a transmitter generating an output representative of the detected position of the indicia on the window.

3. The window position detection and anti-pinch system of claim 1 wherein the coding arrangement is provided on a media applied to the window.

4. The window position detection and anti-pinch system of claim 1 wherein the at least one sensing device includes a first sensing device for detecting the position of the window relative to the window frame and a second sensing device for detecting the presence of an obstruction between the window and window frame.

5. The window position detection and anti-pinch system of claim 4 wherein the second sensing device comprises a transmitter disposed adjacent an upper rear portion of the window frame emitting an energy signal along the inner periphery of the window frame, a receiver in communication with the controller disposed adjacent a lower front portion of the window frame detecting the electromagnetic signal and a prism positioned in the path of the energy signal emitted by the transmitter and arranged to redirect the signal to the receiver.

6. The window position detection and anti-pinch system of claim 8 further comprising a shutter mechanism arranged to block the energy signal if an obstruction contacts a lower end of the shutter mechanism.

7. The window position detection and anti-pinch system of claim 1 wherein the at least one sensing device comprises an infrared light sensing arrangement.

8. A method of detecting the position of a window relative to a window frame of a motor vehicle door assembly, the method comprising:
   positioning a first sensing device adjacent the window;
   positioning a second sensing device in the window frame to detect the presence of an obstruction between the window and window frame;
   detecting the position of the window with the first sensing device based on a coding arrangement etched into a surface of the window, wherein the coding arrangement comprises a plurality of indicia uniformly spaced and correlated to convey the vertical position of the window relative to the window frame;
   generating an output signal representative of the position of the window relative to the window frame based on the coding arrangement on the window;
   generating an output signal based on the detection of an obstruction detected by the second sensing device;
   comparing the output signals generated by the first and second sensing devices against predetermined values to determine whether an obstruction exists between the window and window frame; and
   generating a control signal to stop and reverse the travel of the window upon detection of an obstruction between the window and window frame.

9. The method of claim 8 wherein positioning the second sensing device comprises providing a transmitter disposed adjacent an upper rear portion of the window frame, emitting an energy signal along the inner periphery of the window frame, and receiving the energy signal at a receiver disposed adjacent a lower front portion of the window frame.

10. The method of claim 8 wherein the step of detecting the position of the window with the first sensing device further comprises providing the coding arrangement etched into a surface of the window.

11. The method of claim 8 wherein the step of detecting the position of the window with the first sensing device further comprises applying a media as the coding arrangement on the window.

12. A window position detection and anti-pinch system for a motor vehicle door assembly having a window adjustably positionable in a window frame by a reversible motor operatively connected to the window, the system comprising:
   a first sensing device disposed adjacent the window for detecting the position of the window relative to the window frame, the first sensing device including a rotary member engaging a surface of the window and an encoder rotatably connected to the rotary member for detecting the position of the window relative to the window frame, wherein the encoder is rotated by the rotary member upon the movement of the window and generates an output signal representative of the detected position of the window;
   a second sensing device including a transmitter disposed adjacent an upper rear portion of the window frame emitting an energy signal along the inner periphery of the window frame, a receiver in communication with the controller disposed adjacent a lower front portion of the window frame detecting the electromagnetic signal and a prism positioned in the path of the energy signal emitted by the transmitter and arranged to redirect the signal to the receiver; and
   a controller responsive to the output of the first and second sensing devices for comparing the output signals against predetermined values to determine whether an obstruction exists between the window and window frame.

13. The window position detection and anti-pinch system of claim 12 wherein the first sensing device comprises an encoder having a plurality of electrical contacts provided on an outer periphery of the encoder and at least one electrical contact in communication with the controller for monitoring pulses generated by the rotation of the plurality of contacts on the encoder upon the movement of the window.

14. The window position detection and anti-pinch system of claim 12 wherein the first sensing device comprises an encoder having a multi-poled magnet centrally disposed in the encoder and a receiver in communication with the controller comprising a Hall effect sensor disposed radially outwardly of the magnet for monitoring pulses generated by the rotation of the magnet on the encoder.

15. The window position detection and anti-pinch system of claim 12 wherein the first sensing device comprises an encoder having a plurality of intermittent holes positioned about the periphery of the encoder allowing an electromagnetic signal to pass through and a photointerrupter in communication with the controller positioned adjacent the encoder for monitoring pulses generated by the interruption of the electromagnetic signal by the rotation of the encoder based on the change in position of the window relative to the window frame.

16. A method of detecting the position of a window relative to a window frame of a motor vehicle door assembly, the method comprising:

- positioning a first sensing device adjacent the window, wherein the first sensing device is a rotary member engaging a surface of the window which includes an encoder rotably connected to the rotary member for detecting the position of the window relative to the window frame;
- generating an output signal with the encoder representative of the position of the window relative to the window frame;
- positioning a second sensing device in the window frame to detect the presence of an obstruction between the window and window frame;
- generating an output signal based on the detection of an obstruction detected by the second sensing device;
- comparing the output signal generated by the firts and second sensing device against predetermined values to determine whether an obstruction exists between the window and window frame; and
- generating a control signal to stop and reverse the travel of the window upon detection of an obstruction between the window and window frame.

17. The method of claim 16 wherein positioning an encoder comprises providing an encoder having a plurality of electrical contacts provided on an outer periphery of the encoder and at least one electrical contact in communication with the controller for monitoring pulses generated by the rotation of the plurality of contacts translated from a change in position of the window relative to the window frame.

18. The method of claim 16 wherein positioning an encoder comprises providing an encoder having a multi-poled magnet centrally disposed in the encoder and a receiver in communication with the controller comprising a Hall effect sensor disposed radially outwardly of the magnet for monitoring pulses generated by the rotation of the magnet on the encoder translated from a change in position of the window relative to the window frame.

19. The method of claim 16 wherein positioning an encoder comprises providing an encoder having a plurality of intermittent holes positioned about the periphery of the encoder allowing an electromagnetic signal to pass through and a photointerrupter in communication with the controller positioned adjacent the encoder for monitoring pulses generated by the interruption of the electromagnetic signal by the rotation of the encoder based on the change in position of the window relative to the window frame.

* * * * *

UNITED STATES PATENT AND TRADEMARK OFFICE
CERTIFICATE OF CORRECTION

PATENT NO. : 6,936,984 B2
DATED : August 30, 2005
INVENTOR(S) : Robert H. Wilson It is certified that error appears in the above-identified patent and that said Letters Patent is hereby corrected as shown below:

Column 11,
Line 29, delete "fist" and insert -- first --.

Signed and Sealed this

Thirteenth Day of December, 2005

JON W. DUDAS
*Director of the United States Patent and Trademark Office*